H. TUTTLE.
Automatic Valve-Lifter.

No. 227,600.  Patented May 11, 1880.

Witnesses:

Inventor:

UNITED STATES PATENT OFFICE.

HOSMER TUTTLE, OF CEDAR RAPIDS, IOWA.

AUTOMATIC VALVE-LIFTER.

SPECIFICATION forming part of Letters Patent No. 227,600, dated May 11, 1880.

Application filed January 21, 1880.

*To all whom it may concern:*

Be it known that I, HOSMER TUTTLE, of Cedar Rapids, Iowa, have invented a new and useful Improvement in Automatic Locomotive-Valve Lifters, of which the following is a specification.

Figure 1:
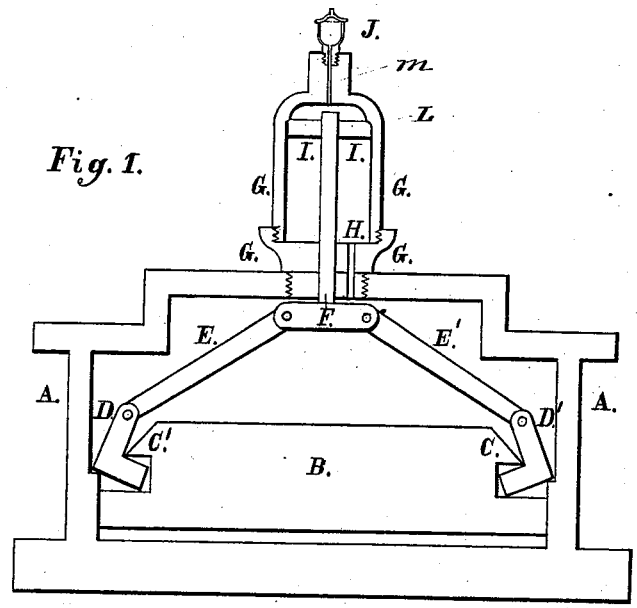
Figure 2:
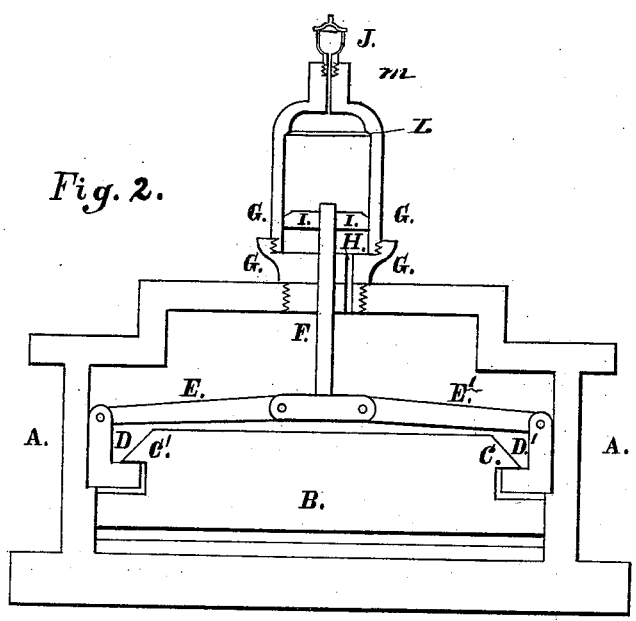

Figure 1 is a transverse vertical cross-section with the valve down. Fig. 2 is the same with the valve lifted.

Similar letters indicate corresponding parts.

The object is to furnish an automatic valve-lifter in the steam-chest of a locomotive-engine; and it consists of a piston and rod working in a cylinder placed upon the steam-chest, connected by rods with two cast-iron wings placed on opposite sides of the steam-chest in journal-boxes, these wings engaging respectively with a lug in the side of the valve nearest thereto, the piston being worked by steam one way and by suction the other.

In the drawings, A is the steam-chest of a locomotive-engine, containing a valve, B, with lugs $c$ and $c'$ cast thereon. D and D' are cast-iron carrying-wings, resting in journal-boxes on opposite sides of the steam-chest, and so shaped as to engage the lugs $c$ and $c'$ for raising and lowering the valve B. E and E' are rods connecting the wings D and D' with the piston I. G is the steam-cylinder in which the piston works. H is a steam-port. L is a seat for the piston at the top of the cylinder G. J is an oil-cup, and $m$ a vent-hole therein.

When the steam is shut off a suction from the cylinder of the engine draws down the piston and raises the valve B, giving free circulation to the piston and filling the vacuum, thereby allowing the engine to run free without noise. The valve B is lowered automatically in the same way by the steam from the steam-chest, which enters the cylinder through the port H.

I claim—

1. The valve B, provided with lugs $c$ and $c'$, in combination with the cast-iron wings, connecting-rods, and piston, substantially as and for the purpose named.

2. The combination of the valve-lifting mechanism and connections with the steam chest, port, and cylinder, provided with a steam-tight seat and crowned with an oil-cup and vent-hole, substantially as and for the purpose set forth.

HOSMER TUTTLE.

Witnesses:
A. ST. CLAIR SMITH,
O. H. LYNN.